(12) United States Patent
Woicke (10) Patent No.: US 9,191,485 B2
(45) Date of Patent: Nov. 17, 2015

(54) PATIENT COMMUNICATION AND MONITORING METHOD AND SYSTEM

(76) Inventor: Michael Duane Woicke, Olathe, KS (US)

( * ) Notice: Subject to any disclaimer, the term of this patent is extended or adjusted under 35 U.S.C. 154(b) by 0 days.

(21) Appl. No.: 13/211,340

(22) Filed: Aug. 17, 2011

(65) Prior Publication Data

US 2012/0045044 A1 Feb. 23, 2012

Related U.S. Application Data

(60) Provisional application No. 61/374,401, filed on Aug. 17, 2010.

(51) Int. Cl.
*H04M 1/64* (2006.01)
*H04M 1/725* (2006.01)
*H04M 3/51* (2006.01)

(52) U.S. Cl.
CPC ........ *H04M 1/72552* (2013.01); *H04M 3/5141* (2013.01); *H04M 2203/551* (2013.01); *H04M 2203/558* (2013.01); *H04M 2203/559* (2013.01); *H04M 2203/654* (2013.01); *H04M 2250/60* (2013.01)

(58) Field of Classification Search
CPC . H04M 1/57–1/658; H04M 1/72519–1/72586; H04M 3/42365–3/42391; H04M 3/53–3/548; H04M 7/0012–7/0069; H04M 2201/42; H04M 2201/50; H04M 2201/52; H04M 2201/54; H04M 2201/60; H04M 2203/30–2203/658; H04M 2250/60
USPC ................................. 370/259–271, 351–357; 379/67.1–88.28, 201.01; 455/412.1–426.2, 456.1–466, 455/550.1–560, 575.1–575.9, 90.1–90.3; 704/270–278; 709/201–207, 217–248; 348/14.01–14.16

See application file for complete search history.

(56) References Cited

U.S. PATENT DOCUMENTS

| | | | | | |
|---|---|---|---|---|---|
| 4,468,529 | A | * | 8/1984 | Samuel et al. | 379/114.26 |
| 5,289,531 | A | * | 2/1994 | Levine | 379/93.23 |
| 5,870,549 | A | * | 2/1999 | Bobo, II | 709/206 |
| 5,982,863 | A | * | 11/1999 | Smiley et al. | 379/88.18 |
| 6,163,531 | A | * | 12/2000 | Kumar | 370/260 |
| 6,345,260 | B1 | * | 2/2002 | Cummings et al. | 705/7.19 |
| 7,124,167 | B1 | * | 10/2006 | Bellotti et al. | 709/206 |
| 7,139,800 | B2 | * | 11/2006 | Bellotti et al. | 709/206 |
| 7,248,688 | B2 | * | 7/2007 | Wellons et al. | 379/265.1 |
| 7,607,571 | B2 | * | 10/2009 | Steusloff et al. | 235/375 |
| 7,702,315 | B2 | * | 4/2010 | Engstrom et al. | 455/412.1 |
| 7,839,987 | B1 | * | 11/2010 | Kirchhoff et al. | 379/142.02 |
| 7,849,147 | B2 | * | 12/2010 | Rohall et al. | 709/206 |
| 7,978,828 | B1 | * | 7/2011 | Edamadaka et al. | 379/88.13 |
| 8,127,001 | B1 | * | 2/2012 | Sylvain | 709/224 |

(Continued)

*Primary Examiner* — Hemant Patel
(74) *Attorney, Agent, or Firm* — Raj Abhyanker, P.C.

(57) ABSTRACT

Described and disclosed is a system and method for routing and delivering medical phone messages efficiently in a hospital or clinic setting. The invention includes extending a call resource accessible to medical personnel and patients through an application programming interface and recording communications between users of the system. Messages may then be routed to an appropriate user. Employed is a dual-tone multi-frequency signaling system and setting a sample rate using a global parameter, sample rate and a frame size. The system and method have ability to leave a message mid-call based on the dual-tone multi-frequency signaling wherein the system leaves a generic message while the user is navigated to leave an actual voice message all in a "in-call" process that is transparent to the user.

1 Claim, 11 Drawing Sheets

(56) References Cited

U.S. PATENT DOCUMENTS

| | | | |
|---|---|---|---|
| 8,150,706 B2* | 4/2012 | Kobylevsky et al. | 705/2 |
| 8,183,987 B2* | 5/2012 | Traughber et al. | 340/286.07 |
| 8,533,611 B2* | 9/2013 | Katis et al. | 715/758 |
| 8,554,185 B2* | 10/2013 | Kim | 455/414.1 |
| 2004/0054737 A1* | 3/2004 | Daniell | 709/206 |
| 2004/0136510 A1* | 7/2004 | Vander Veen | 379/88.22 |
| 2005/0032527 A1* | 2/2005 | Sheha et al. | 455/456.1 |
| 2005/0234741 A1* | 10/2005 | Rana et al. | 705/2 |
| 2006/0111948 A1* | 5/2006 | Kivatinetz | 705/4 |
| 2006/0210029 A1* | 9/2006 | Okon | 379/88.18 |
| 2006/0229910 A1* | 10/2006 | Longman et al. | 705/2 |
| 2007/0226010 A1* | 9/2007 | Larsen | 705/2 |
| 2007/0300153 A1* | 12/2007 | Newman et al. | 715/530 |
| 2009/0048869 A1* | 2/2009 | Tyler | 705/2 |
| 2009/0125326 A1* | 5/2009 | Wasson et al. | 705/2 |
| 2009/0132632 A1* | 5/2009 | Jackson et al. | 709/201 |
| 2009/0180598 A1* | 7/2009 | Othmer et al. | 379/88.23 |
| 2009/0204427 A1* | 8/2009 | Benja-Athon | 705/2 |
| 2010/0026817 A1* | 2/2010 | Ryan et al. | 348/207.11 |
| 2010/0290606 A1* | 11/2010 | Ramanathan et al. | 379/112.01 |
| 2012/0130742 A1* | 5/2012 | Church et al. | 705/3 |
| 2013/0024209 A1* | 1/2013 | Goldenberg | 705/3 |

\* cited by examiner

| CALLER 702 | MESSAGE LENGTH 704 | RESPONDED 706 | STATUS 708 | TYPE 710 |
|---|---|---|---|---|
| JON DOE | 220 WORDS | YES | URGENT | SMS |
| DR. ELLIS | 2 MIN | NO | NORMAL | VOICEMAIL |
| DR. PHILLIPS | 3 MIN | YES | ROUTED TO DR. PHILLIP'S NURSE | PHONE CALL |
| ● ● ● ● ● | ● ● ● ● ● | ● ● ● ● ● | ● ● ● ● ● | ● ● ● ● ● |

TABLE 750

PATIENT COMMUNICATION AND MONITORING METHOD AND SYSTEM

CLAIM OF PRIORITY

This application claims priority from and incorporates by reference U.S. Provisional Application No. 61/374,401 entitled "PATIENT COMMUNICATION AND MONITORING METHOD AND SYSTEM" filed on Aug. 17, 2010.

BACKGROUND

Today, physicians, patients, and/or nurses have to deal with phone tag, missed calls and lost voicemails in their day to day communications. Considering the busy schedules of medical professionals and their patients, such phone tag and lost communication is almost unavoidable. In addition, medical professionals face unique problems related to a temporal urgency regarding the personal and private nature of health care related communications. Communications between physicians and patients is highly urgent and needs to be timely conveyed for optimum care. In addition, physicians face problems related to liability, urgency, and privacy in dealing with their communications with other physicians, medical professionals and patients. There is also an emotional aspect to such communications as it deals with sensitive and personal health care matters and as such needs to be tightly controlled and disseminated in a proper manner. Physicians also have to deal with liability issues related to their communications and their exposure to malpractice is often dependent on prompt and careful dissemination of important, time sensitive and private health care information.

Present day messaging systems in the medical space involve a physician navigating to his or her voicemail, another physician's voicemail system or directly contacting or having a nurse call a patient via telephone. A message for a physician may sit on a voicemail system until it is retrieved by the physician and/or his or her nurse. In addition, a physician or patient might not know if a particular message has been listened to. In order to listen to the message, the physician and/or user may have to call back into the messaging system. The current invention is active throughout the complete cycle of the messaging process. It specifically addresses the problems with phone tag, busy lines, and lost voicemails and makes left messages more productive and traceable.

The current invention turns day to day phone tag, busy lines, and lost voicemails into productive communications where messages are archived and maintained for easy retrieval. Current messaging and archival systems only work for users who are using the same messaging system. The present invention is agnostic to the type of end user. It accommodates both subscribed and unsubscribed users. Other systems are generally stand alone and do not allow integration into existing workflows. This invention extends several APIs (Application Programming Interface) which allows a user to add in Call Bridging, Call Conferencing and/or Call Surveys into any programming platform. In addition, these APIs may be all WSDL (Web Services Description Language) compliant.

SUMMARY

The invention discloses a method and a system for routing and delivering medical phone messages by extending call resources accessible through an application programming interface. Communications may be recorded between users of the system and method in a hospital or medical clinic/office setting and the messages may be routed to an appropriate user (e.g., a doctor, a, nurse etc.).

The method may involve monitoring and tracing a call within the system and displaying a message history on a computer user interface accessible to a doctor, for example. A call recording may be made over a group comprising a public switched telephone network and a voice over internet protocol (VoIP) network between users.

The system may involve a medical phone messaging system with a voice communication device and a medical recording and routing server. It may also comprise an application programming interface (API), a dual-tone multi-frequency signal, a call monitoring and tracing provision, and a user interface.

Other features of the present embodiments will be apparent from the accompanying drawings and from the detailed description that follows.

DETAILED DISCLOSURE

The embodiment is a flexible universal medium for a telephony messaging system that is flexible enough to accommodate the most common types of communication today. The embodiment may allow for easy communication between all parties who use the invention. For example, the embodiment may archive and maintain voice and text messages so that they may be easily retrieved. The embodiment may allow subscribed users of the invention to have additional access to features such as message retrieval from a web browser, call initializing, call recording, and/or call tree configuration. The embodiment may also provide alerts to mobile devices via SMS 110 and/or smart phone web access which may allow users to access features such as message retrieval from a web browser, call initializing, call recording, and/or call tree configuration.

According to one embodiment, the invention may encompass the general use of equipment to provide voice communication over distances, specifically by connecting telephones to each other. In another embodiment, Voice over Internet Protocol (VoIP, Voice over IP) which is a general term for a family of methodologies, communication protocols, and/or transmission technologies for delivery of voice communications and multimedia sessions over Internet Protocol (IP) networks, such as the Internet may be used. The embodiment may also be synonymous with VoIP, IP telephony, Internet telephony, voice over broadband (VoBB), broadband telephony, and/or broadband phone.

It may be contemplated in one embodiment that Internet telephony may refer to communications services—voice, facsimile, and/or voice-messaging applications that are transported via the Internet, rather than the public switched telephone network (PSTN). The basic steps involved in originating an Internet telephone call may involve conversion of the analog voice signal to digital format and/or compression/translation of the signal into Internet protocol (IP) packets for transmission over the Internet; the process may be reversed at the receiving end. In another embodiment, VoIP systems may employ session control protocols to control the set-up and tear-down of calls as well as audio codecs which may encode speech may allow transmission over an IP network as digital audio via an audio stream. Codecs used may vary between different implementations of VoIP (and often a range of codecs are used); some implementations may rely on narrowband and compressed speech, while others may support high fidelity stereo codecs.

The embodiment may also be implemented in various ways using both proprietary and/or open protocol standards. Examples of technologies to implement such an embodiment may include: H.323, IP Multimedia Subsystem (IMS), Media Gateway Control Protocol (MGCP), Session Initiation Protocol (SIP), Real-time Transport Protocol (RTP), and/or Session Description Protocol (SDP). According to another embodiment, a user may choose options to flatten and/or hide uninteresting parts of the call tree. A user may separate out symbols that were gathered from different threads of execution, hide missing symbols or libraries, and/or flatten branches of the call tree that contain recursive calls. These options of the embodiment may help the user trim irrelevant portions of the call tree and/or organize the remaining data in ways that may make it easier to spot trends. In one embodiment, a call tree may include a list of key physicians and/or nurses to be contacted, for example, in the event of a medical emergency. Many of these physicians and/or nurses may be responsible for contacting additional medical professionals, who in some cases may contact still others.

In one embodiment, the invention may allow call tree enabling which may allow physicians, patients, nurses, and/or other users to assign a call sequence in the event the original caller is not available. The call tree may continue dialing down the call tree until a physician and/or user answers. The embodiment may allow this process to occur behind the scenes so that the original caller may not have to stay on the line. Once a physician and/or other user answers the call, the call may then be routed back to call initiator 102.

Figure 1:
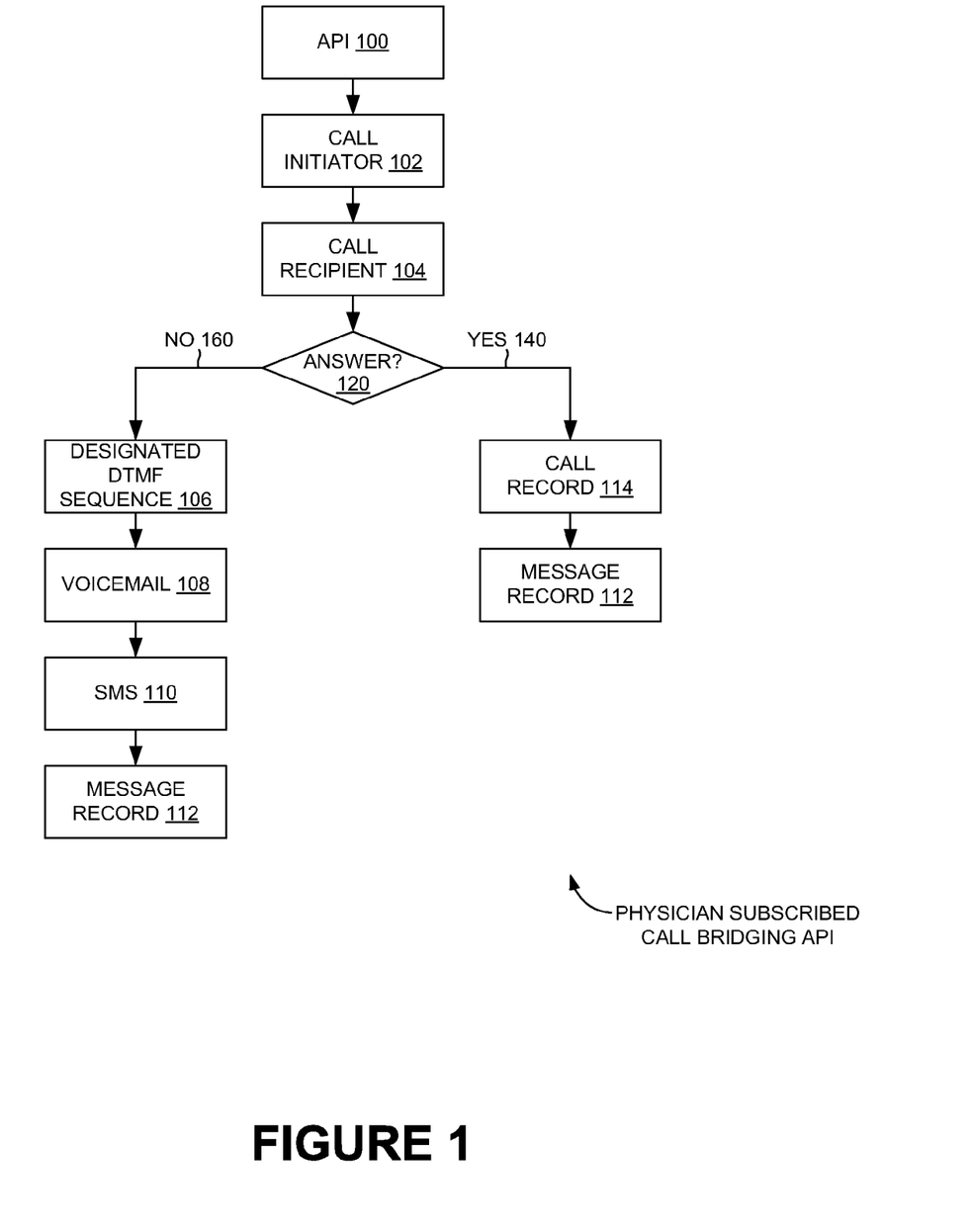
FIG. 1 describes a physician subscribed call bridging API.

Call initiator 102 may be anyone that initiates a call to another party to either relay a message or simply collaborate and call recipient 104 may be anyone who the call initiator is trying to call or contact. According to this embodiment, such collaboration may be between either physician-to-physician and/or physician-to-patient. The invention may also make a unique distinction between subscribed and unsubscribed users. Only subscribed users may receive SMS alerts and may simply click on the phone number included in the SMS and may not need to manually dial the phone number. Subscribed users may reply back via SMS to the messaging system and may have access to the invention's messaging system which then may contain a feature packed configuration and message archiving. The underlying processes of the embodiment make the invention unique. The embodiment may also allow a user to control when a message is left. By pounding (#) out of the messaging system using a designated DTMF sequence 106, the embodiment may leave a generic message which may then be audited.

In one embodiment, the application programming interface (API) 100 may be an interface implemented by a software program to enable interaction with other software, similar to the way a user interface may facilitate interaction between humans and/or computers. Such an embodiment may create an abstraction barrier between custom/extension code and a core, usually a commercial program. In another embodiment, the goal of API 100 may be to let a programmer write programs that won't break when upgrading the underlying system. In still another embodiment, API 100 may include automatically generated documentation from docstrings in the source code using Epydoc. Such an embodiment may also include a set of callable routines that a programmer may use to interact with an application. It may also include a well specified software component that may allow one software component to talk to another one, even if they may not developed by the same people, and without knowing the details of how the other component may be implemented. In one embodiment, APIs in Java may consist of a set of objects that developers may use to add some functionality to a project. In this embodiment, many complicated tasks may be abstracted and easily performed using an API that other developers may have made available.

The application programming interface (API) 100 may be an interface implemented by a software program which may enable it to interact with other software, according to one embodiment. It may facilitate interaction between different software programs similar to the way the user interface facilitates interaction between humans and computers. The API 100 may be implemented by applications, libraries, and/or operating systems to determine their vocabularies and/or calling conventions, and may be used to access their services. It may include specifications for routines, data structures, object classes, and/or protocols used to communicate between the consumer and/or the implementer of the API 100. The API 100 may describe the ways in which a particular task may be performed. For example, in UNIX systems, the math.h include file for the C language may contain the definition of the mathematical functions available in the C language library for mathematical processing (usually called libm). This file may describe how to use these functions and the expected result. In another embodiment related to object oriented languages, the API 100 may include a description of a set of class definitions, with a set of behaviors associated with those classes. A behavior may include a set of rules for how an object, derived from that class, may act in a given circumstance. This abstract concept may be associated with the real functionalities exposed, or made available, by the classes that may be implemented in terms of class methods. The API 100 in this embodiment may be conceived as the totality of all the methods publicly exposed by the classes (usually called the class interface). This may mean that the API 100 prescribes the methods by which one may handle the objects derived from the class definitions. More generally, one may see the API 100 as the collection of all the kind of objects one can derive from the class definitions, and their associated possible behaviors. The use again may be mediated by the public methods, but in this embodiment, the methods may be seen as a technical detail of how the behavior may be implemented.

According to one embodiment, the API 100 may be used in the context of web development, and may define a set of Hypertext Transfer Protocol (HTTP) request messages, along with a definition of the structure of response messages, which may usually be in an Extensible Markup Language (XML) and/or JavaScript Object Notation (JSON) format. While "Web API" is virtually a synonym for web service, the recent trend (so-called Web 2.0) has been moving away from Simple Object Access Protocol (SOAP) based services towards more direct Representational State Transfer (REST) style communications. Web APIs may allow the combination of multiple services into new applications known as mashups.

A Web services description language (WSDL), which is a specification that is published to a UDDI directory may be implemented according to one embodiment. WSDL may provide interface/implementation details of available Web services and UDDI Registrants. It may also leverage XML to describe data types, details, interface, location and/or protocols. WSDL may also be in an XML-based format for describing network services and may provide a model for describing web services.

In another embodiment, the WSDL may define services as collections of network endpoints, and/or ports. The WSDL specification may provide an XML format for documents for this purpose. The abstract definitions of ports and messages may be separated from their concrete use or instance, allowing the reuse of these definitions. A port may be defined by associating a network address with a reusable binding, and/or a collection of ports may define a service. Messages may be abstract descriptions of the data being exchanged, and port types may be abstract collections of supported operations. The concrete protocol and data format specifications for a particular port type may constitute a reusable binding, where the operations and messages then may be bound to a concrete network protocol and message format. In this way, WSDL may describe the public interface to the web service.

In another embodiment, WSDL may also be used in combination with SOAP and an XML Schema to provide web services over the Internet. A client program connecting to a web service may read the WSDL to determine what operations are available on the server. Any special data types used may be embedded in the WSDL file in the form of XML Schema. The client may then use SOAP to actually call one of the operations listed in the WSDL.

Figure 2:
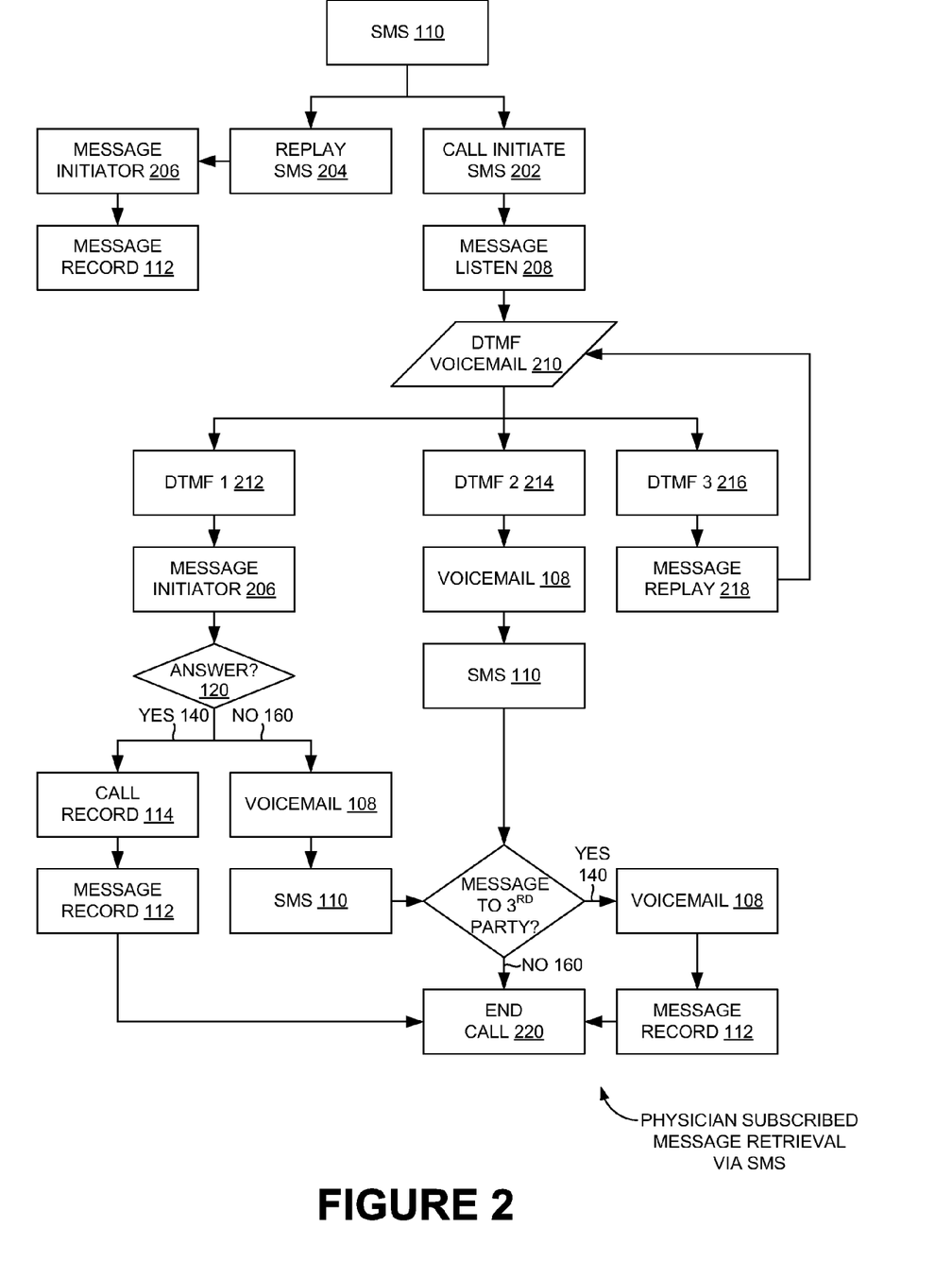
FIG. 2 describes an API for physician subscribed message retrieval via SMS.

Dual-tone multi-frequency signaling (DTMF Voicemail 210) may be used in one embodiment for telecommunication signaling over analog telephone lines in the voice-frequency band between telephone handsets and/or other communications devices and the switching center. DTMF may refer to the signaling method used by touch-tone telephones wherein each key may generate two tones, the combination of which may be unique for each of the 12 keys. It may also be used as a method for touch-tone phones to make dialing an easier process; each digit may correspond to one of 16 combinations of pairs of sine waves chosen from eight different frequencies (example: the 7 digit may be defined as the combination of 852 Hz and 1209 Hz). In another embodiment, DTMF may allow navigation of voice menus and/or other advanced calling services wherein the embodiment may allow for the transfer of different-frequency signals through the network. When pushing a number key on the phone an individual signal may be transferred to the network. This function may be required for access to certain network functions, like, for example, voice mail. DTMF may assign a specific frequency (made up of two separate tones) to each key so that it may easily be identified by a microprocessor, according to one embodiment.

It may be contemplated that, according to one embodiment, that DTMF Voicemail 210 may be used for telephone call signaling. In this embodiment, DTMF coding may be based on two tones used to generate a digit. Two of eight tones may be combined so as to generate sixteen different DTMF digits. The DTMF decoding may also be based on the discrete Fourier transform (DFT). Using this algorithm, 16 DTMF receivers may be implemented on 4 four frequency Goertzel algorithm function blocks. Then, the output of Goertzel algorithm may be decoded into a digit.

According to one embodiment, in a DTMF signal generation, a DTMF keypad may be used for digit entry; the resultant DTMF tones may be generated mathematically and added together. The values may be logarithmically compressed and passed to the receiver. In a DTMF scheme, pairs of tones may be used to signal the digits 0 through 9, pound (#), star (*), and/or the digits A, B, C and D. For each pair, one of the tones may be selected from a low group of four frequencies, and the other from a high group of four frequencies. The correct detection of a digit may require both a valid tone pair and the correct timing intervals. In another embodiment, each symbol on a typical telephone key pad may be represented by the sum of the two frequencies that intersect the digit. The row frequencies may be in a low band, below 1 kHz, and the column frequencies may be in a high band, between 1 kHz and 2 kHz. The digits may be displayed as they would appear on a telephone's 4×4 matrix keypad (on standard telephone sets, the fourth column may be omitted). In one embodiment, different algorithms may be possible for generation and/or detection of DTMF tones. Also, due to the fact that Hypersignal Block Diagram/RIDE may be ever evolving, certain block functions may be replaced by newer functions, and some blocks may even become obsolete.

In one embodiment, DTMF signal generation may be implemented relatively straightforwardly. The sample rate for the system may be set using the global parameters, sample rate, and framesize. Sine Generators may be used to generate the row and column tones which may then be added together to form the DTMF. The frequencies of the two generators may be controlled through the keypad, which may generate the selected row and column and which may then be used by the row and column table lookup block functions. In another embodiment, the selected tones may be added together, and the resultant waveform may be sent to a gain block, (the level of which may be controlled by a knob and gated with a keypad 'button pressed' value) and then may be sent to a display for viewing. In order to allow the DTMF to be heard by the user, the generated signal may also be sent to a sound card.

According to one embodiment, decoding a DTMF signal may involve extracting the two tones in the signal and determining from their value the intended DTMF digit. Tone detection may often be done in analog circuits by detecting and counting zero-crossings of the input signal. In digit circuits, tone detection may be easier to accomplish by mathematically transforming the input time-domain signal into its frequency-domain equivalent by means of the Fourier transform, and/or through use of tone-specific digital filters. The approach that may be taken by an algorithm for DTMF tone detection, according to one embodiment, may involve taking the Fourier transform of the observed signal and searching for energy at the frequencies of interest. The algorithm may be implemented by Discrete Fourier Transform (DFT). The analysis frame may have to be long enough to resolve the DTMF frequencies, but may also have to be short enough to detect the minimum length tone. In an exemplary embodiment, a 12.75 ms frame at a sampling rate of 8 kHz may be a good choice.

In calculating the DFT for one embodiment, the Goertzel algorithm, a method for calculating any single coefficient of a DFT, may chosen over a fast Fourier transform (FFT) algorithm. In order to obtain the required frequency resolution at an 8 kHz sampling rate, a 256-point FFT may be required. Since the algorithm for tone detection may require knowledge of the energy at only 16 frequencies, it may be more efficient to execute the Goertzel algorithm for these frequencies. In addition, the Goertzel algorithm may be recursive, eliminating the need to store 256 samples for the FFT for each DTMF detector. This may save both time and/or data memory in the simulation and/or the real time applications.

It may be contemplated according to one embodiment that the Goertzel algorithm may be thought of as a second-order IIR filter for each DFT coefficient. In one embodiment, the state variables of the filter may be set to zero initially. Then, the filter may be executed N times. The output at this point, yk(N), is the k'th coefficient of a length N DFT. The filter may be implemented as a direct form II second-order section. The recursive part of the filter is on the left-hand side of the delay elements, and the nonrecursive part is on the right. Since only the output at time N is needed, it may only be necessary to compute the nonrecursive part of the filter after the last iteration of the recursive part. A further simplification in the algorithm may be made by observing that only the square of the magnitude of the DFT coefficient is needed. Therefore, according in the above mentioned embodiment, it may only be necessary to store the value, $2 \cos(2\pi k/N)$, for each coefficient to be evaluated.

According to one embodiment, the implementation of a DTMF decoding may be implemented using a Hypersignal Block Diagram. This application may make use of a simple DTMF Test Tone Generator, made up of two Sine Generator blocks and an Add block. DTMF decoding may be done by finding the maximum row and maximum column energy. This task may be performed by using 2 Four Frequency Goertzel Algorithm blocks. In each four freq. Goertzel Algorithm block, the magnitude of four frequencies may be detected simultaneously. These four magnitudes may then used by the 4-input Max function to determine the zero-based index of the winning frequency. One of the Four Frequency Goertzel Algorithm/4-input Max pair of blocks may be used to determine the row index, while the other may be used to determine the column index. Then the detected row index may be shifted left by 2 and/or logically OR'ed with the column index to create a zero-based index representing the detected DTMF. In this embodiment, a level detect may also be implemented to discriminate against noise. One way to accomplish this may be to use the other output of the 4-input Max blocks, which may deliver the magnitudes of the detected row and column, in conjunction with a minimum energy detection algorithm, comprised mainly of two threshold blocks.

It may also be contemplated that the application of DTMF coding and decoding in Hypersignal Block diagram may be used in one embodiment. In this embodiment, the DTMF Keypad block may allow digit entry and may have four outputs. The first output may be the row number of the key that was last pressed (0-3), the second output may be the column number of the key that was last pressed (0-3), the third output may be the value of the key pressed, and the fourth output may be 1 if a key is being pressed, 0 otherwise. Once the generation of DTMF has been performed, and the decoder example has been added, the Test Tone Generator may be replaced with a sound card A/D to actually get real-time signals. Assuming a standard PC-based sound card, with proper connections to a microphone and speakers which are physically close to each other, pressing the DTMF keypad may result in a detected zero-based index. The embodiment may also be smart phone enabled so that it may allow users to manage the messaging system through their mobile phone. The embodiment may be HTML 5 compliant and may be plug-and-play compatible so that it may be added into any software system for workflow customization.

One embodiment may provide a call bridging API 100 to a subscribed physician. In this embodiment, an API 100 may be invoked to place an outbound call to call initiator 102 which then may be transferred to a call recipient 104. According to this embodiment, if call recipient 104 answers the call, the embodiment may record the call from call initiator 102 as call record 114 and then may record the message from call initiator 102 as message record 112. If call recipient 104 does not answer the phone from call initiator 102, the embodiment may allow the user to use a designated DTMF sequence 106 to leave the system and may record a voicemail 108, which in turn may send a SMS 110 text message alert to call recipient 104 and may record the message from call initiator 102 as message record 112.

Another embodiment may provide message retrieval via SMS 110 to a subscribed physician. In this embodiment, a SMS 110 may be sent to which then may let the physician to either respond using a reply SMS 204 or start a call using the call initiate SMS 202. If the physician chooses to use the reply SMS 204, the embodiment may relay an alert to message initiator 206. On the other hand, if the physician chooses to start a call using the call initiate SMS 202, then the embodiment may allow the physician to hear the message via message listen 208. At this point in the present embodiment, the physician may have three options. Once a physician hears a message via message listen 208, he or she may have three DTMF Voicemail 210 options—call back call initiator 102, leave reply messages and/or replay messages. The DTMF 1 212 option may allow a callback to message initiator 206 and if message initiator 206 answers, it may engage in record 114 and message record 112 before ending the call. If message initiator 206 does not answer, the embodiment may record the call using voicemail 108 and may send a SMS 110 to a third party before ending the call. In the current embodiment, DTMF 2 214 may allow call initiator 102 and/or a physician to leave a reply message using voicemail 108 and may send a SMS 110 to a third party which may once again allow call initiator 102 and/or a physician to save a message using voicemail 108 which may then be recorded in the embodiment as message record 112 before ending the call. In the same embodiment, DTMF 3 216 may allow call initiator 102 and/or a physician to listen to his/her messages using message reply 218.

Figure 3:
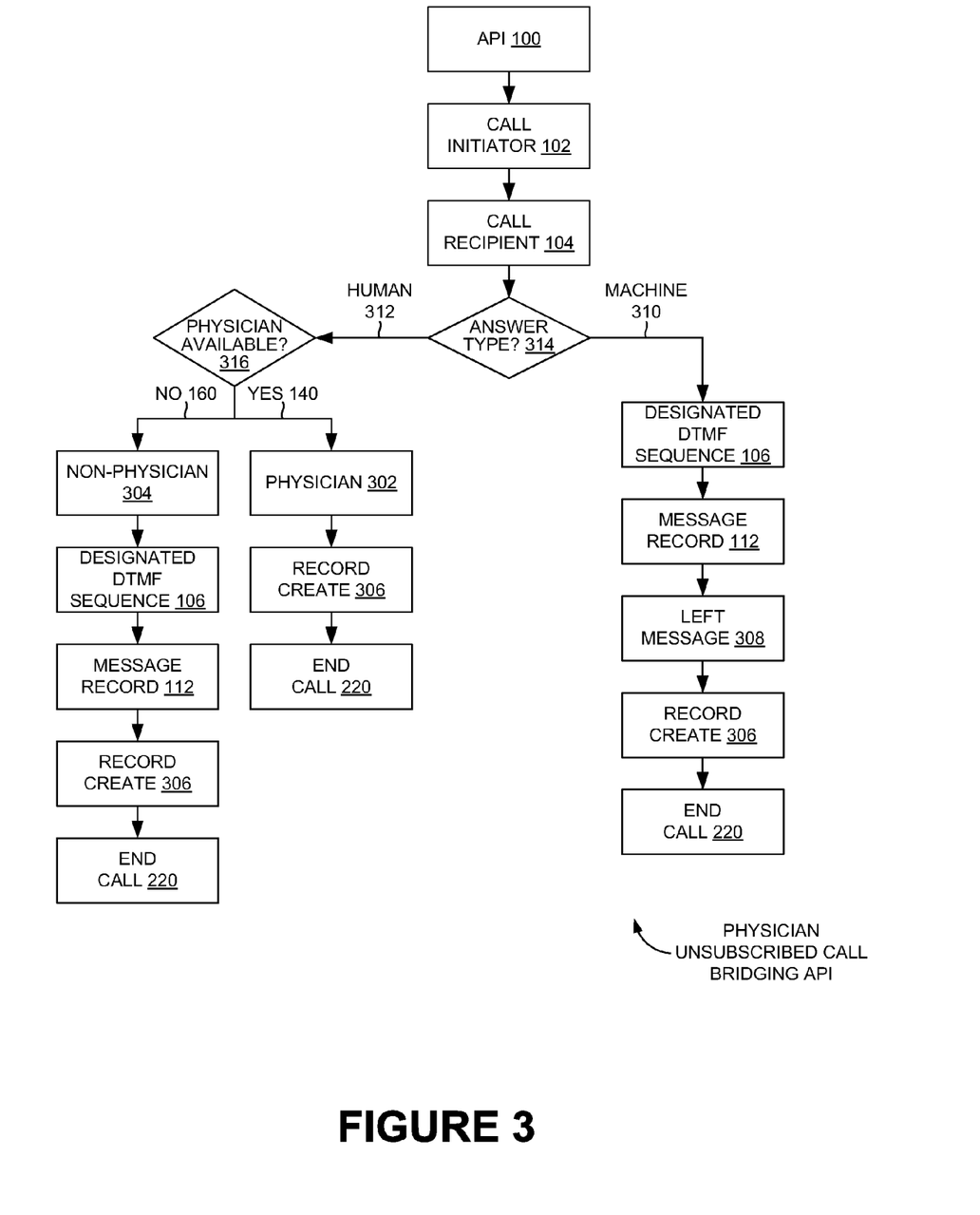
FIG. 3 describes a physician unsubscribed call bridging API.

According to one embodiment, a call bridging API 100 may be used by an unsubscribed physician. In this embodiment, an API 100 may be invoked to place an outbound call to call initiator 102 which then may be transferred to a call recipient 104. According to this embodiment, if call recipient 104 answers the call and is human, then the embodiment may check to see if the human is a physician 302. If the human is a physician 302, then the embodiment may allow collaboration between call initiator 102 and physician 302. It may then also allow for saving the call via record create 306 before ending the call. If physician 302 is not available, the embodiment may allow call initiator 102 to leave a message with non-physician 304 before leaving the system using a designated DTMF sequence 106. The embodiment may then allow for call tracing, monitoring and/or recording functions such as message record 112 and record create 306 before ending the call. In the current embodiment, if call recipient 104 answers the call is not human, then the embodiment may allow call initiator 102 to leave the system by using a designated DTMF sequence 106 and may then allow for call tracing, monitoring and/or recording functions such as message record 112, left message 308 and record create 306 before ending the call.

Figure 4:
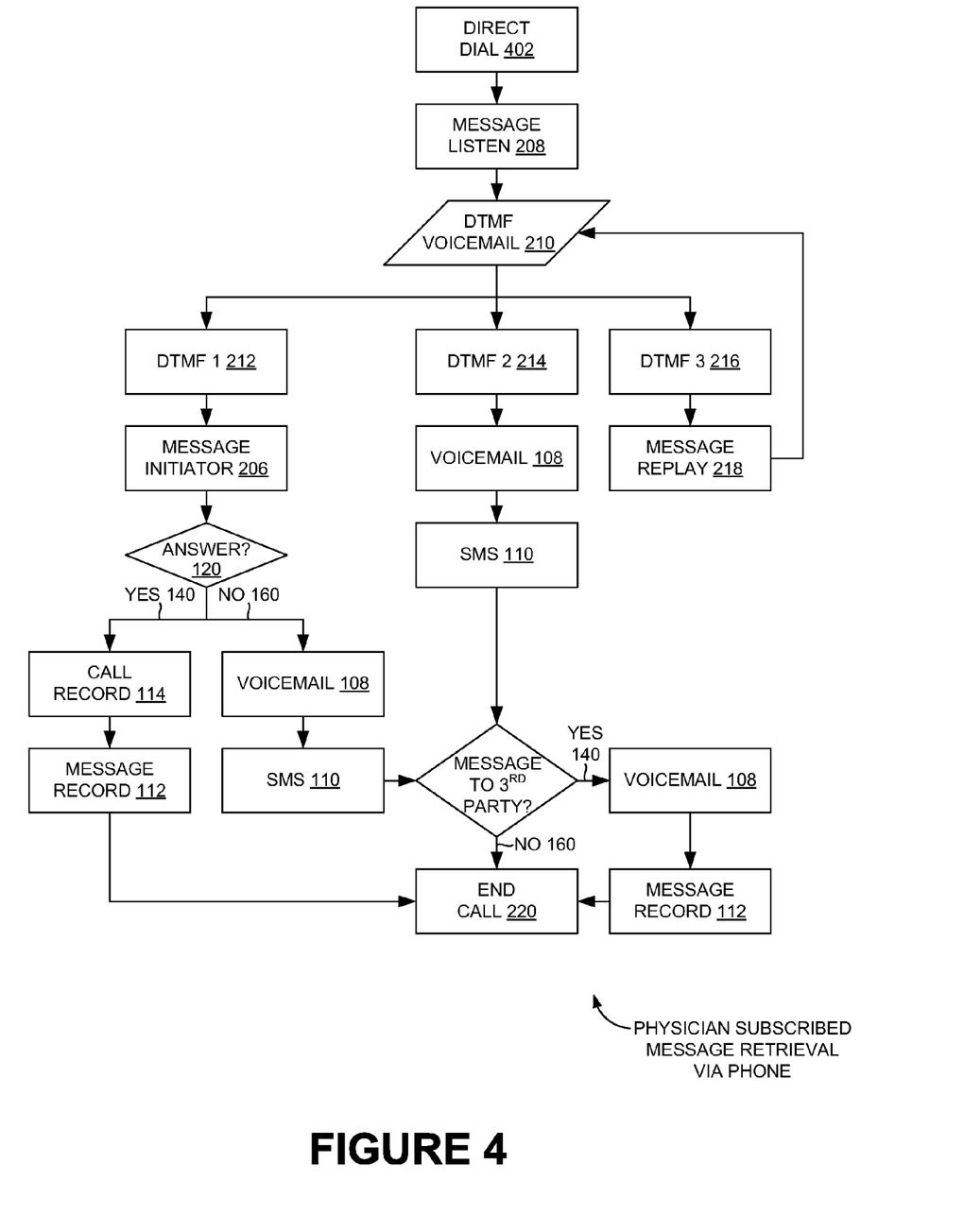
FIG. 4 describes an API for physician subscribed message retrieval via phone.

Yet another embodiment may provide message retrieval via telephone to an unsubscribed physician. In this embodiment, direct dial 402 may be used to hear a message using message listen 208. Once a physician hears a message via message listen 208, he or she may have three DTMF Voicemail 210 options—call back call initiator 102, leave reply messages and/or replay messages. The DTMF 1 212 option may allow a callback to message initiator 206 and if message initiator 206 answers, it may engage in record 114 and message record 112 before ending the call. If message initiator 206 does not answer, the embodiment may record the call using voicemail 108 and may send a SMS 110 to a third party before ending the call. In the current embodiment, DTMF 2 214 may allow call initiator 102 and/or a physician to leave a reply message using voicemail 108 and may send a SMS 110 to a third party which may once again allow call initiator 102 and/or a physician to save a message using voicemail 108 which may then be recorded in the embodiment as message record 112 before ending the call. In the same embodiment, DTMF 3 216 may allow call initiator 102 and/or a physician to listen to his/her messages using message reply 218.

Figure 5:
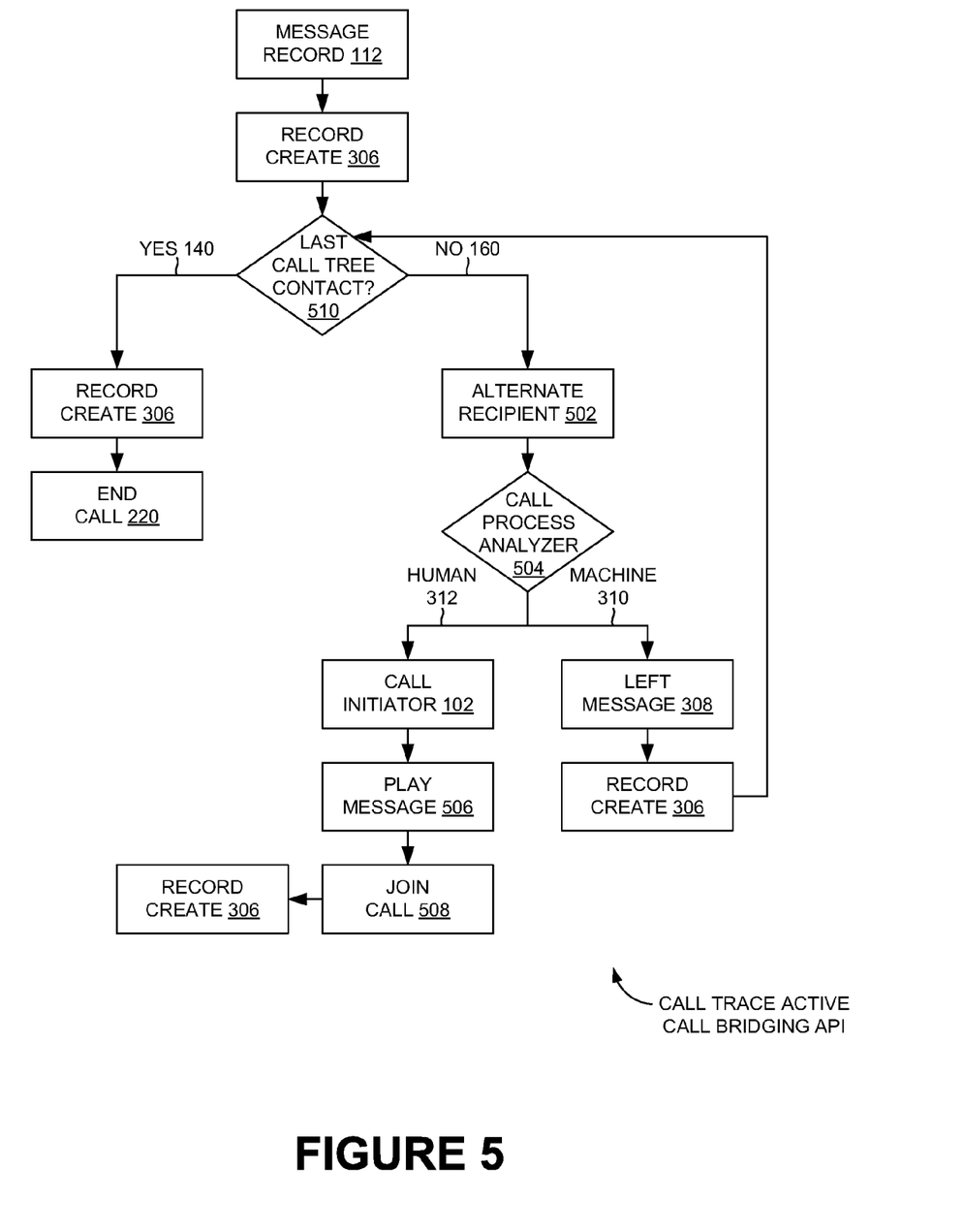
FIG. 5 describes a call tree active call bridging API.
Figure 6:
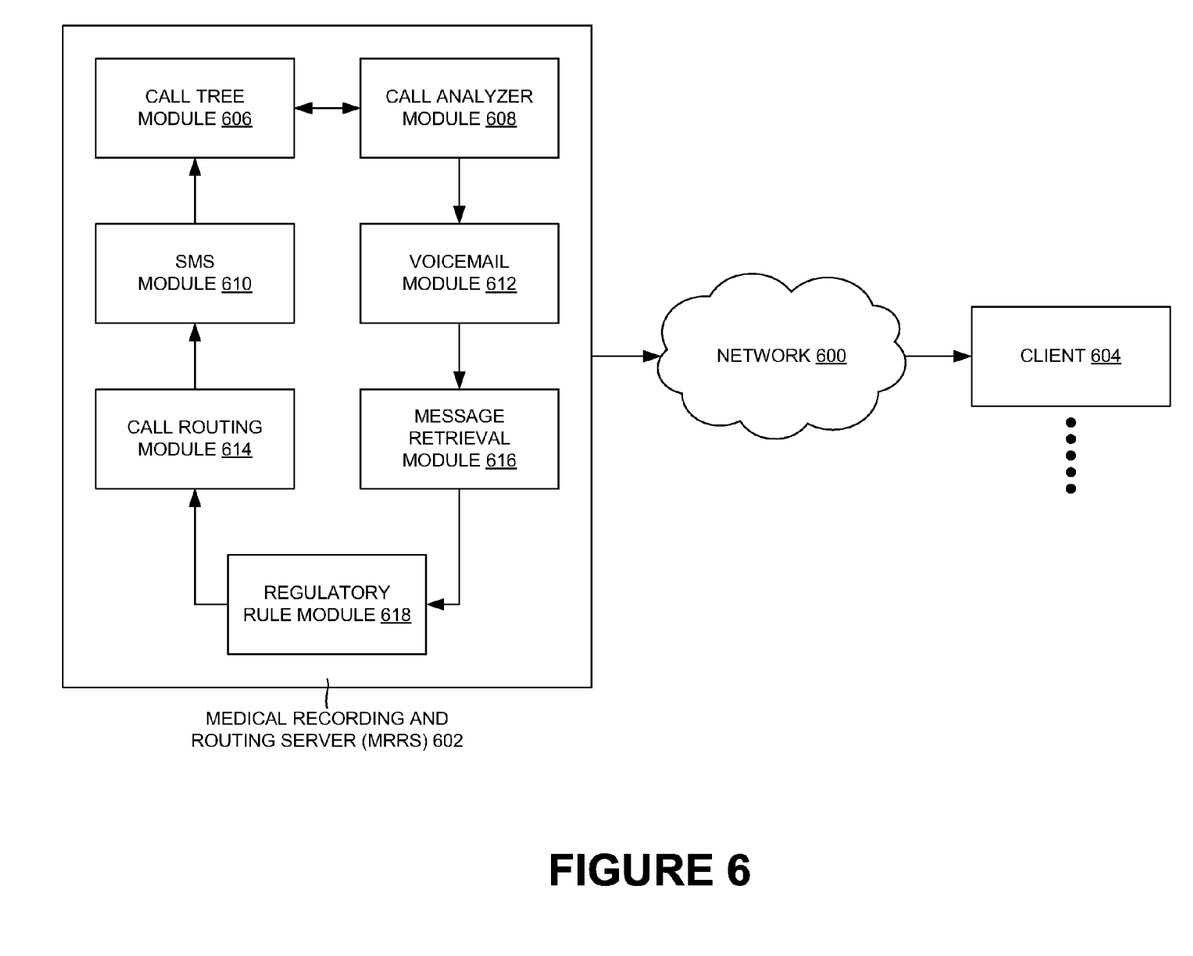
FIG. 6 is a graphical representation of the medical recording and routing server.
Figure 7:
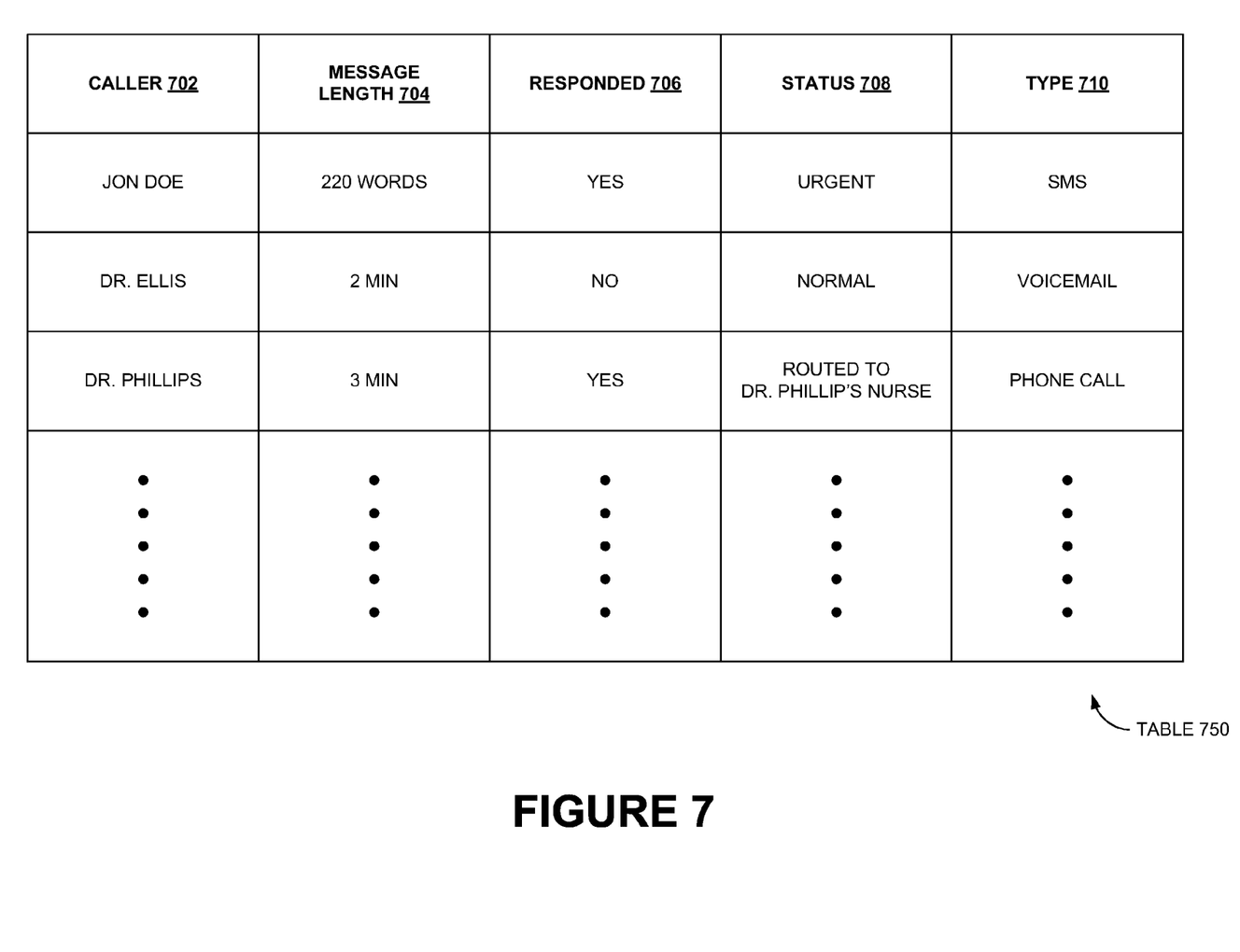
FIG. 7 is a table that shows the call monitoring and tracking provisions.
Figure 8:
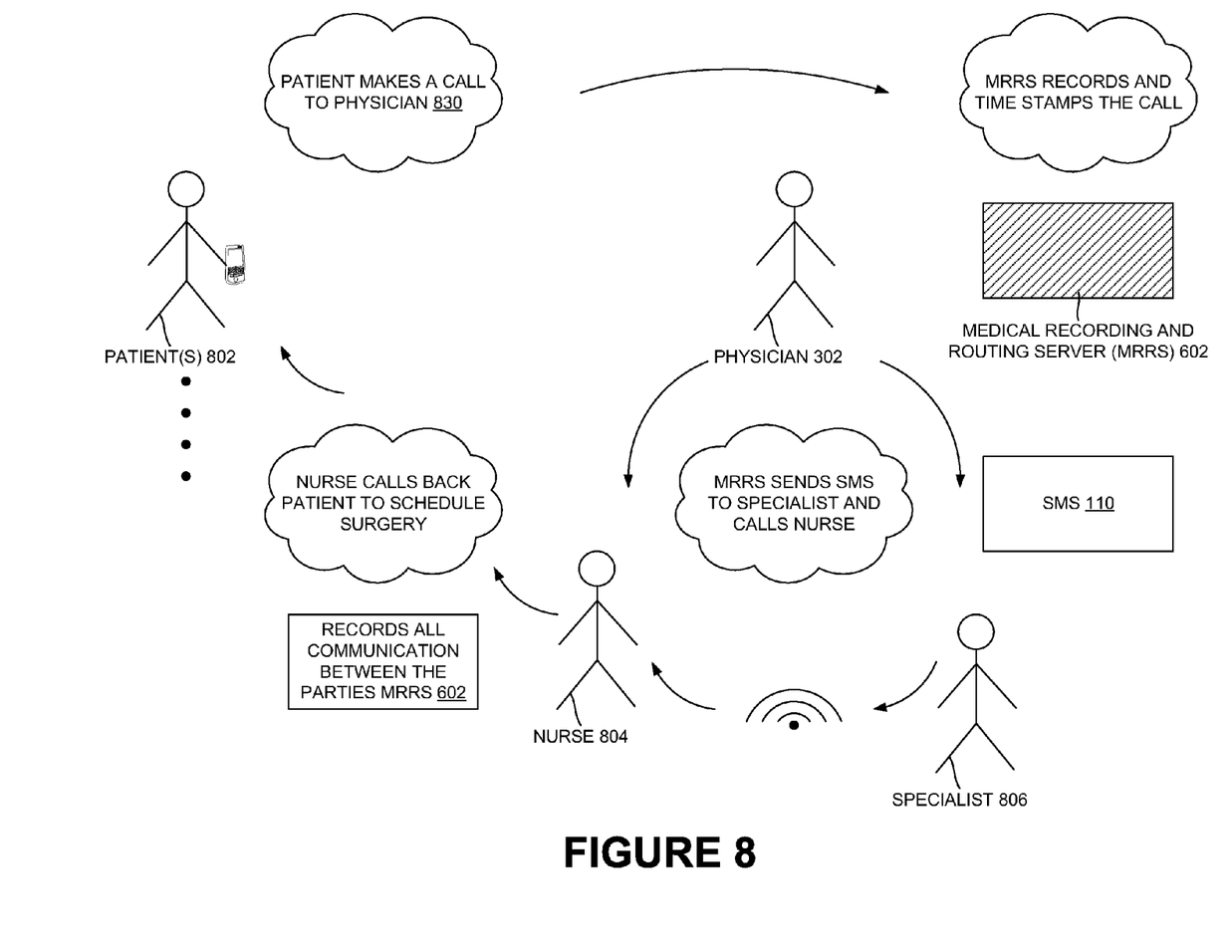
FIG. 8 is a graphical depiction of the call monitoring and tracking provisions.
Figure 9:
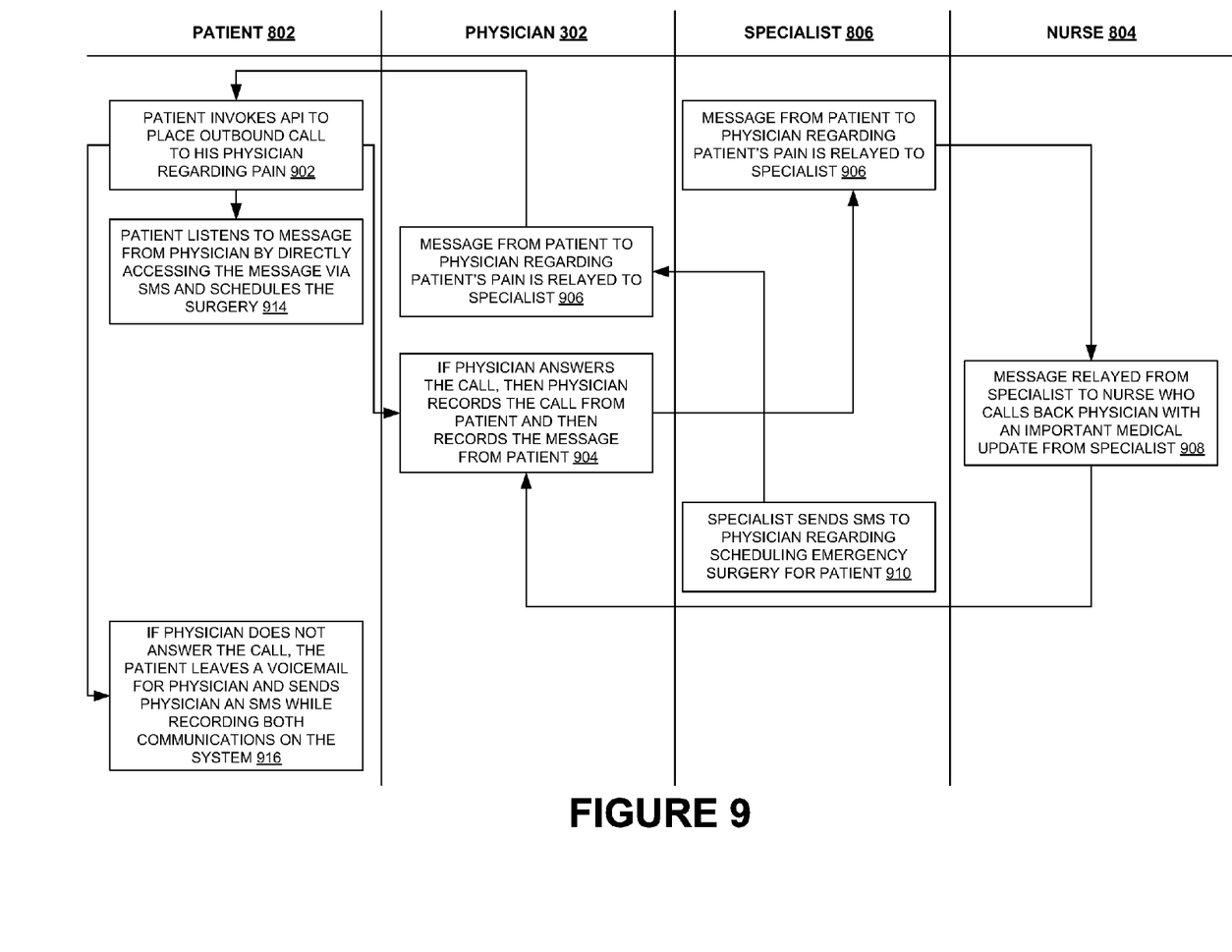
FIG. 9 is a flow chart that describes the call tracing provisions.
Figure 10:
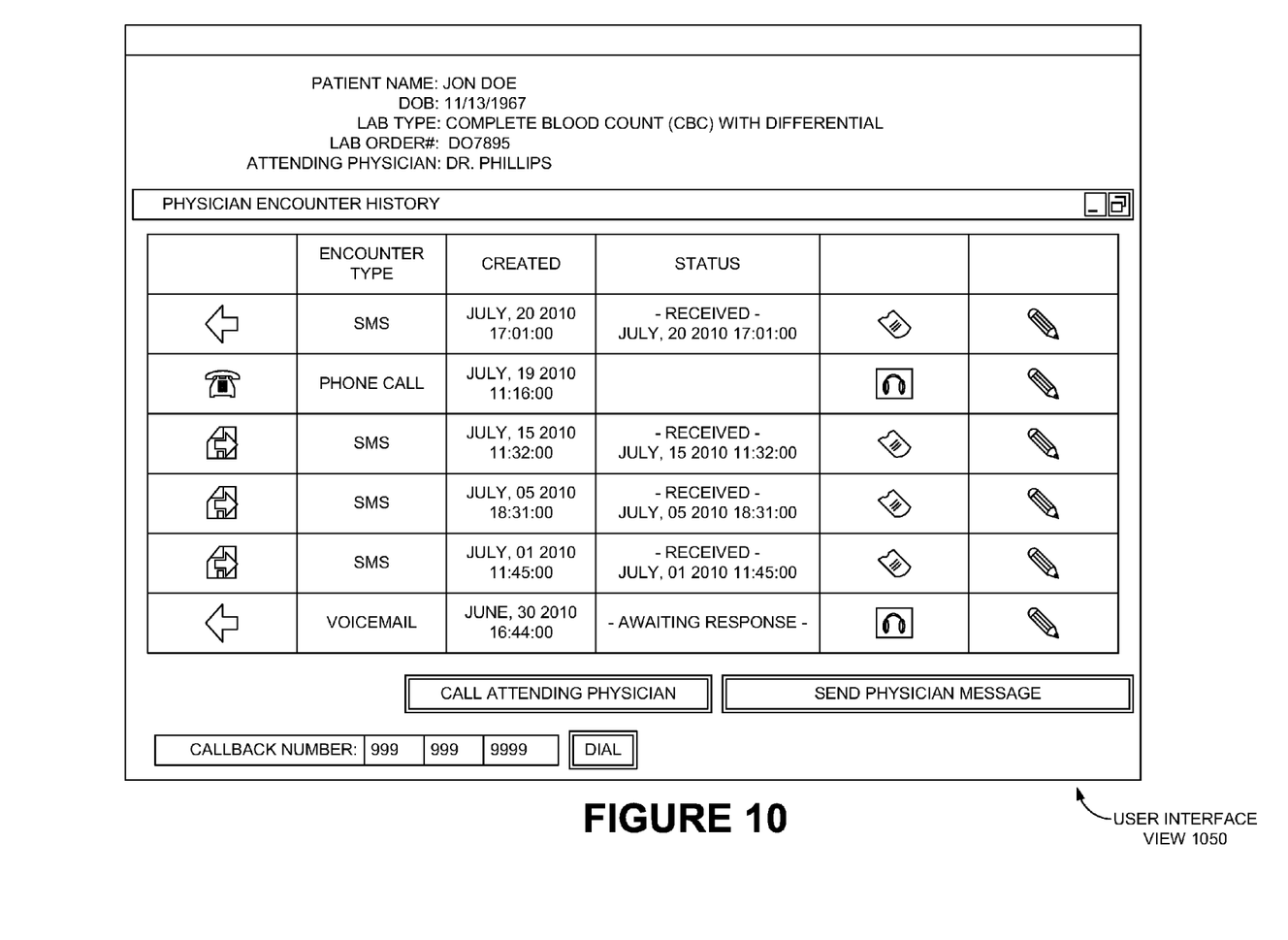
FIG. 10 describes the user interface.
Figure 11:
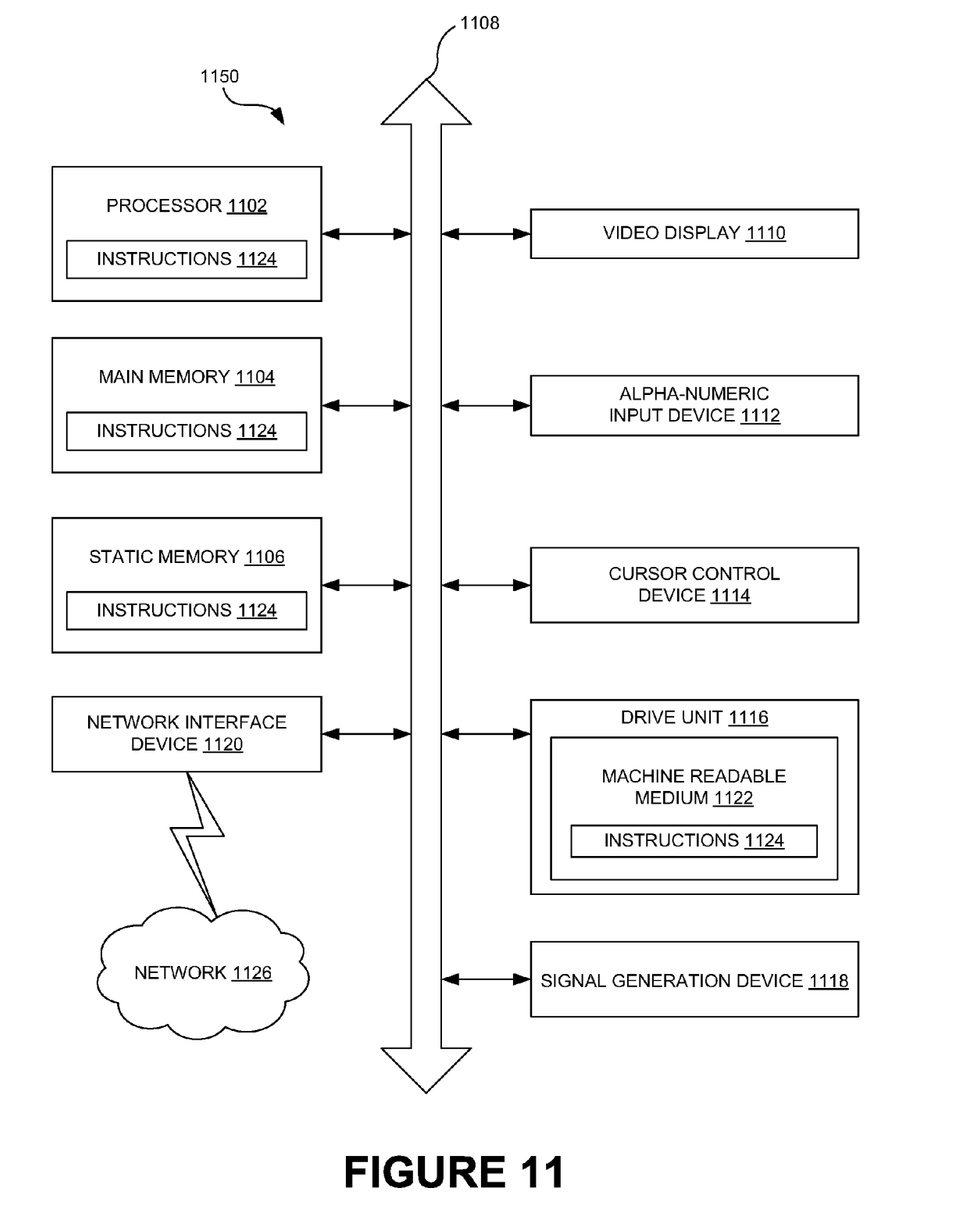
FIG. 11 describes a generic computer interface.

One particular embodiment may also allow for call tree configuration using a call bridging API. In this embodiment, messages left using message record 112 and recorded using record create 306 may follow a pre-determined call tree configuration. If the message is from the last call tree contact, then the embodiment may allow for call tracing, monitoring and/or recording functions using record create 306 before ending the call. If the message is not from the last call tree contact, then the embodiment may place an outbound call to alternate recipient 502. The embodiment may then analyze results from call process analyzer 504. If a human answers the call, then the embodiment may place an outbound call to call initiator 102 and may then play the message to the alternate contact using play message 506 and may even let the alternate contact collaborate will call initiator 102 using join call 508 before allowing for call tracing, monitoring and/or recording using record create 306. If a non-human answers the call, the embodiment allows for call tracing, monitoring and/or recording using left message 308 and record create 306.

It may also be contemplated that, according to one embodiment, a custom specific survey to a patient's health care regimen may be scheduled by physician 302. Such a survey may be used to collect quantitative and/or qualitative information about items in a medical population and may allow collection about patients' characteristics, behaviors, attitudes, and/or perceptions regarding their treatment relating to their medical problem. Statistical techniques may then be used to determine the validity, reliability, and/or statistical significance of patient data. This embodiment may also provide a survey wherein cross-sectional, longitudinal, and/or time-series survey design techniques may be implemented. In this survey, statistical analysis may also be performed in real-time on data that is reported out of the embodiment. This embodiment may also have the ability to set threshold alerts based on user's response to questions asked by physician 302 and/or any other person.

Message retrieval may be secured by means of a personal identification number (PIN) or even a voiceprint according to one embodiment. According to this embodiment, the PIN may be a secret numeric password shared between physician 302 and a third party that may be a patient, another physician, and/or a nurse and may be used to authenticate the user to the system. The user may be required to provide a non-confidential user identifier or token and/or a confidential PIN to gain access to the embodiment's features. Upon receiving the user ID and PIN, the system may look up the PIN based upon the user ID and may compare the looked-up PIN with the received PIN. The user may be granted access only when the number entered matches with the number stored in the embodiment. In addition, the embodiment may also allow for message retrieval by employing biometric identification of users and electronically recording and/or graphically representing a user's voice. Such a voiceprint may uniquely characterize individual users of the embodiment such as a patient, physician, and/or nurse and may provide a set of measurable characteristics of a human voice that may uniquely identify a user for message retrieval.

In yet another embodiment, an alert maybe disseminated to a group of physicians or even a group of medical facilities based on a set search criteria including any combination of the following (physician availability, physician specialty, proximity, medical equipment availability, medication availability, blood unit type availability, and/or hospital bed availability, etc.) which may be all supplied from a relational database. Responses to these alerts may either be in a quick response format (e.g. yes/no) or in a voice response format (e.g. playback audio) in which responses are viewed and listened to in real-time through a web interface or mobile interface. End users of the alert may opt-in to participate in a conference call by pressing the designated DTMF sequence provided in the message and without the need of supplying a conference ID or PIN. Alternately, based on user's response to the alert, the message initiator may have the ability to select only a select group of individuals to participate in an on-the-fly Conference Call through the same web and/or mobile interface. According to an exemplary embodiment, a call audit may be possible wherein the system may leave a generic message while the user is navigated to leave the actual voice message all in a "in-call" process that is transparent to the user. According to one or more embodiments, it is this generic message that contains dial-in info to access the actual message which may be audited for retrieval via the messaging platform.

An example embodiment of the disclosure may be described as follows: Dr. Ellis (a specialist) may need to contact Dr. Phillips (a primary care physician) regarding patient Jon Doe's test results which may show that Jon Doe is in need of immediate hospitalization. Dr. Ellis may pick up the phone and call Dr. Phillips but may get his office voicemail and may be prompted to leave a message and may do so. Dr. Ellis may not be able to contact Jon Doe directly because he may not have his contact information so he may have to wait for a return call from Dr. Phillips. The very next day Jon Doe may complain of a major head ache and may be rushed to the hospital where he may be subject to a pre-administered and identical battery of tests only to find out that he has suffered a stroke from due to a brain aneurysm. The hospital may finally contact Dr. Phillip with news of Jon Doe's condition. Dr. Phillip may then call Dr. Ellis inquiring about the status of Jon Doe's test results and at that point may be informed that he had called earlier and left a message stating the urgency of the outcome Jon Doe's test results. Dr. Phillip's Nurse who usually checks the office's voicemail may claim that the voicemail left regarding Jon Doe's test results did not contain any form of urgency. Patient Jon Doe may later find out that his preliminary tests already showed signs of the aneurysm and if caught earlier and operated on, he would not have suffered a stroke. Jon Doe decides to take legal action due to his physician's negligence. If Dr. Ellis had left a message using Digital Response Technologies LLC's telephony messaging solution, the same urgent message could have been marked as urgent to activate the Physician's call tree whereas calls and text messages to alternate Physicians may have been performed until a contact was established. In addition, since this same telephony messaging system is able to audit message retrieval, it would have detected and reported that the message was listened to and an audio representation of the message would have been replayed to show that the context of the message left virtually no room for misinterpretation and was clearly urgent enough to illicit an immediate response from Dr. Phillip's Nurse.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising:
   determining that a first telephonic call arriving at a first number is associated with a particular caller based on a call-identification data;
   determining that a first voicemail message of the first telephonic call is saved in a non-transitory storage medium associated with the first number;
   associating a forwarded number of the first voicemail message of the first telephonic call with the first number and a call-forwarding history of the first telephonic call;
   generating an archived view of the first number, the forwarded number, and the call-identification data;
   presenting the archived view to a user of a medical tracking system through a web interface;
   archiving the first telephonic call associated with the particular caller, based on the call-identification data;
   recording the first voicemail message of the first telephonic call;
   saving the first voicemail message in the non-transitory storage medium associated with the first number;
   providing a call-tree configuration for retrieval for at least one of the call-identification data, the first voicemail message, and a voicemail retrieval history;
   generating a dual-tone multi-frequency signaling over a telephone line in a voice-frequency band;
   utilizing a row tone and a column tone using a sine generator and adding the row tone and the column tone to the sine generator to form a dual-tone multi-frequency signal;
   controlling a frequency of the dual-tone multi-frequency signal through a keypad; and
   decoding the dual-tone multi-frequency signal by extracting two tones in the dual-tone multi-frequency signal and determining from their value an intended dual-tone multi-frequency signal digit;
   extending a call resource accessible through an application programming interface;
   recording a second telephonic call between an initial caller and a recipient performed through the application programming interface;
   routing a second voicemail message to an appropriate user;
   notifying the initial caller of a voicemail message retrieval;
   monitoring, tracing and auditing the second telephonic call, the second voicemail message, and the voicemail message retrieval;
   notifying the initial caller of the voicemail message retrieval using alerts to a data processing system; and displaying a message recording history on at least one of a computer user interface and a mobile device;
   recording the second telephonic call made over at least one of a group comprising a public switched telephone network and a voice over internet protocol network between the plurality of users;
   recording a short message service communication between the plurality of users; and
   routing a short message service message to the appropriate user,
   wherein a sample rate of the dual-tone multi-frequency signal is be set using a global parameter and a frame size.

* * * * *